United States Patent [19]

McFall

[11] Patent Number: 5,425,281
[45] Date of Patent: Jun. 20, 1995

[54] FLUID PENDULUM ARRANGEMENT FOR IMPLEMENTING FAST ERECTION OF VERTICAL GYROSCOPES

[75] Inventor: Shawn D. McFall, Charlevoix, Mich.

[73] Assignee: AlliedSignal Inc., Morris Township, Morris County, N.J.

[21] Appl. No.: 568,107

[22] Filed: Aug. 16, 1990

[51] Int. Cl.⁶ .............................................. G01C 19/46
[52] U.S. Cl. ......................................... 74/5.44; 33/327
[58] Field of Search .................... 74/5.44, 5.8, 5.41, 74/5.1, 5.12; 33/327

[56] References Cited

U.S. PATENT DOCUMENTS

| | | | |
|---|---|---|---|
| 2,457,150 | 12/1948 | Herondelle | 74/5.44 |
| 3,543,587 | 12/1970 | Kawada | 74/5.8 X |

FOREIGN PATENT DOCUMENTS

| | | | |
|---|---|---|---|
| 855155 | 5/1940 | France | 74/5.1 |
| 1058270 | 5/1959 | Germany | 74/5.44 |
| 0164207 | 8/1985 | Japan | 74/5.44 |

Primary Examiner—Charles T. Jordan
Assistant Examiner—Theresa M. Wesson
Attorney, Agent, or Firm—Howard G. Massung

[57] ABSTRACT

A fluid pendulum arrangement is used for implementing fast initial erection of vertical gyros by maintaining the gyro wheel spin axis near vertical during the gyro "power-off" mode of operation. Fluid is contained in a lower fluid chamber section which is disposed below the rotational axes of the gyro inner and outer gimbals. The mass of the fluid in cooperation with the fluid chamber moment arm results in a gyro wheel pendulosity that is greater than the combined gyro component friction torques. Upon the "power-on" or gyro wheel spin up mode of operation, the fluid tends to migrate from the lower section of the chamber to an upper section thereof which is arranged relative to the gimbal rotational axes so that gyro wheel pendulosity is negligible. In one embodiment of the invention, the fluid chamber is an external "add-on" feature to the gyro wheel rotor and in another embodiment, the fluid chamber is integral with said rotor.

8 Claims, 2 Drawing Sheets

FLUID PENDULUM ARRANGEMENT FOR IMPLEMENTING FAST ERECTION OF VERTICAL GYROSCOPES

BACKGROUND OF THE INVENTION

This invention relates to a fluid pendulum arrangement for use with a vertical gyroscope (gyro) whereby the gyro wheel remains near vertical when the gyro is disabled so that fast initial erection, i.e. gyro verticality, is achieved upon the gyro being enabled.

Rapid arming of unmanned flight vehicles such as, for example, missiles or drones, requires fast initial erection for vertical gyros used in the guidance systems for such vehicles.

Prior to the present invention, mechanical and electronic apparatus associated with fast erection torquer circuits has been used for the described purpose. However, such apparatus is neither reliable nor cost effective, and is otherwise not particularly desireable for the purpose intended.

The present invention is a passive mechanical arrangement that replaces and eliminates the need for the aforementioned apparatus, and thus provides a reliable cost effective arrangement for implementing fast initial erection of vertical gyros used in guidance systems for unmanned flight vehicles.

SUMMARY OF THE INVENTION

This invention contemplates a fluid pendulum arrangement for implementing fast initial erection of a vertical gyro, wherein the fluid pendulum arrangement maintains the gyro wheel spin axis near vertical (erect) during the gyro "power-off" or disabled mode. A fluid chamber is arranged with the gyro wheel rotor. Fluid is contained in a lower section of the fluid chamber disposed below the rotational axes of the gyro inner and outer gimbals. The mass of the fluid cooperates with the moment arm of the chamber to result in a gyro wheel pendulosity that is greater than the combined gyro component friction torques, with an adequate safety factor being used. In the "power-on" or enabled mode, i.e. gyro wheel spin-up, the fluid tends to migrate from the lower fluid chamber section to an upper fluid chamber section via connecting conduits due to the gyro wheel spin centrifugal acceleration. The upper fluid chamber section is disposed relative to the inner and outer gimbal axes so that the net dynamic gyro wheel pendulosity is negligible. This results in minimal drift associated with gyroscope lateral acceleration. The magnitude of the centrifugal acceleration is typically substantially greater than environmental accelerations, rendering the fluid immune to undesirable dynamic effects.

DETAILED DESCRIPTION OF THE INVENTION

Figure 1:
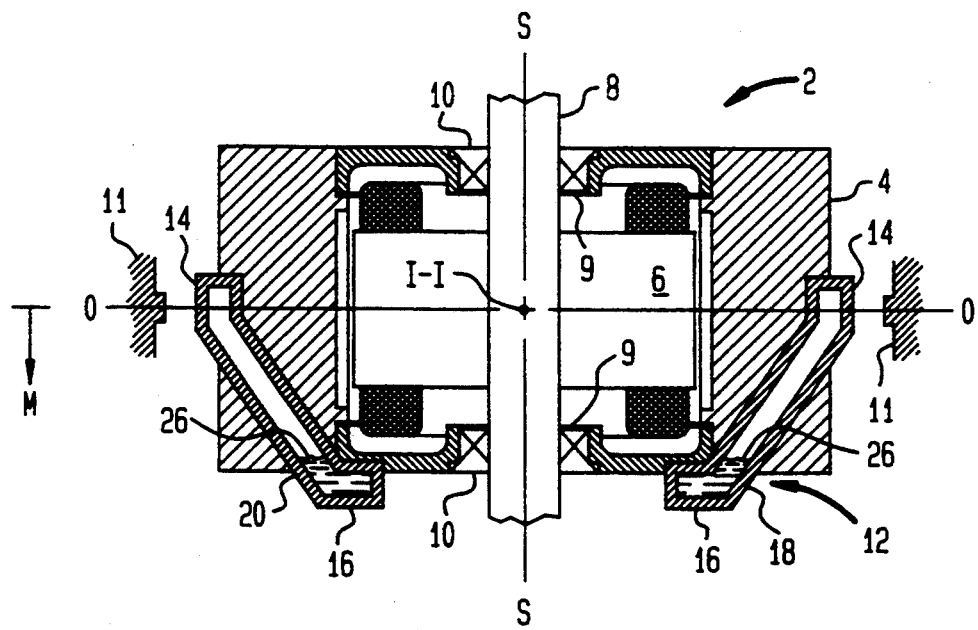
FIG. 1 is a diagrammatic front elevational view of an embodiment of the invention, wherein the disclosed fluid pendulum arrangement is an add-on feature to the gyro wheel.
Figure 2:
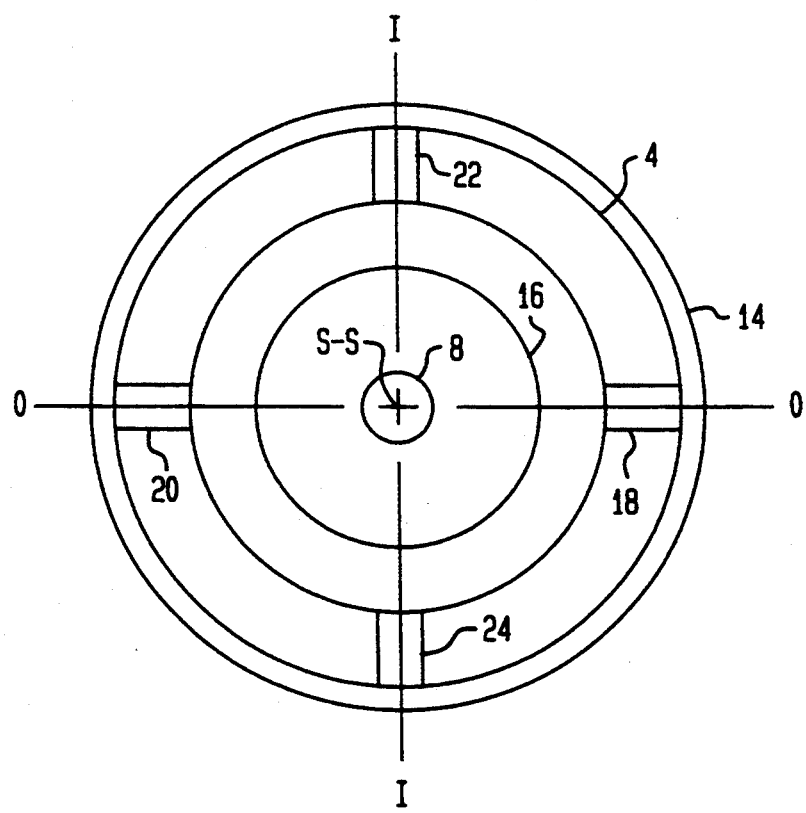
FIG. 2 is a diagrammatic top plan view of the embodiment of the invention shown in FIG. 1.

With reference to FIGS. 1 and 2, a vertical gyro wheel is designated generally by the numeral 2 and includes a rotor 4 and a stator 6. Rotor 4 is mounted to a shaft 8 which is journaled in an inner gimbal 9 via bearings 10.

Gyro wheel rotor 4 spins about a spin axis S—S. Gyro inner gimbal 9 has a rotational axis I—I and a gyro outer gimbal 11 has a rotational axis O—O. Inner gimbal 9 is journaled to rotate in outer gimbal 11 and the outer gimbal is journaled to rotate in a gyro case, the same not being otherwise shown.

Since the actual gyro configuration is not within the scope of the present invention, only as much of the gyro as is required for an understanding of the invention has been herein illustrated and described.

With continued reference to FIGS. 1 and 2, a fluid chamber designated generally by the numeral 12 has an upper annular section 14 and a lower annular section 16. Upper annular section 14 is larger in diameter than lower annular section 16, and the upper and lower annular sections are coupled via a plurality of conduits shown for purposes of example as four in number and designated by the numerals 18, 20, 22 and 24.

Fluid chamber 12 surrounds gyro wheel rotor 4 and is secured thereto as by cementing or the like so as to spin or rotate with gyro wheel rotor 4 about spin axis S—S. Lower fluid chamber section 16 is disposed below outer gimbal axis O—O and inner gimbal axis I—I and upper fluid chamber section 14 is disposed above said axes, as will be discerned from the Figures.

A fluid 26 which may be, for purposes of example, a silicone oil having a low viscosity over the range of gyro operating conditions, is disposed in lower fluid chamber section 16. In this regard, it will be understood that the lower fluid chamber section may have a port or the like (not otherwise shown) through which the fluid is received, and thereafter the port is sealed with the fluid retained in the lower chamber section. Fluid chamber 12 has a moment arm designated as M in FIG. 1.

The arrangement described maintains spin axis S—S of gyro wheel rotor 4 near vertical, i.e. erect, during the "power-off" or disabled mode of gyro operation. This is accomplished with fluid 26 residing in lower fluid chamber section 16 which is below inner and outer gimbal axes I—I and O—O, respectively, as aforenoted. The mass of fluid 26 cooperates with moment arm M of fluid chamber 12 so that a pendulosity of wheel rotor 4 is achieved which is greater than the combined gyro component friction torques, with an adequate safety factor employed.

Upon the "power-on" mode of gyro operation, i.e. spin-up of wheel rotor 4, fluid 26 in lower fluid chamber section 16 tends to migrate into upper fluid chamber section 14 via conduits 18, 20, 22 and 24 due to the spin centrifugal acceleration of the gyro wheel rotor. Fluid chamber section 14 is disposed with relation to axes I—I and O—O so that the net wheel rotor pendulosity is negligible. Thus, drift associated with gyro lateral acceleration is minimized. It is to be noted that the magnitude of the wheel rotor spin centrifugal acceleration is typically in the order of twenty times greater than environmental accelerations, thereby rendering fluid 26 insensitive to undesirable dynamic effects.

The configuration described with reference to FIGS. 1 and 2 relates to an embodiment of the invention wherein fluid chamber 12 is an external "add-on" component to the gyro wheel rotor. The configuration to be next described relates to an embodiment of the invention wherein a fluid chamber for the purposes intended is integral with the gyro wheel rotor.

Figure 3:
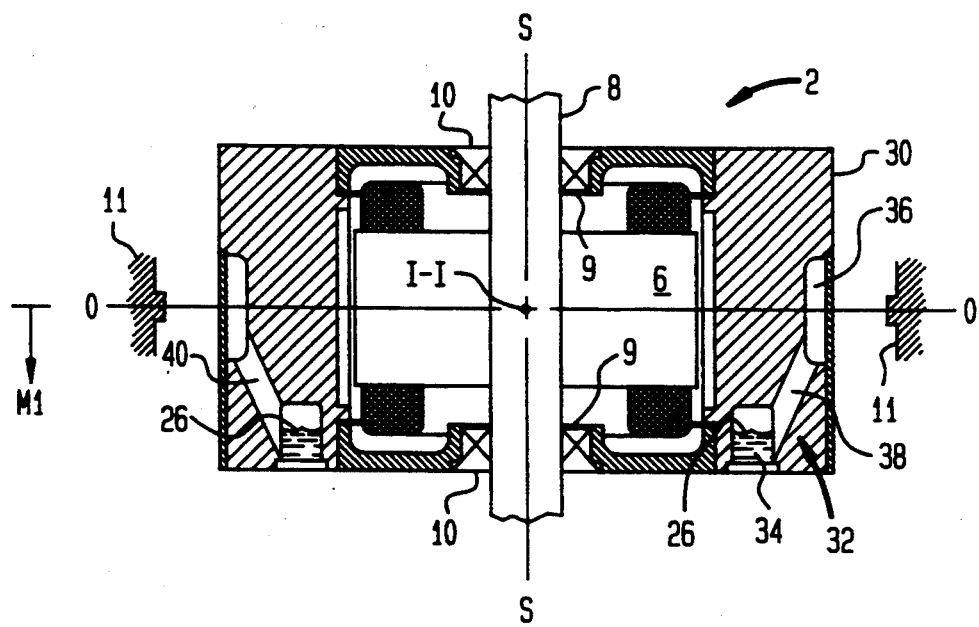
FIG. 3 is a diagrammatic front elevational view of an embodiment of the invention wherein the disclosed fluid pendulum arrangement is integral with the gyro wheel.

With reference then to FIG. 3, wherein components corresponding to those shown and described with reference to FIGS. 1 and 2 carry corresponding numerical designations, a gyro rotor wheel is designated by the numeral 30. Gyro wheel rotor 30 includes a fluid chamber designated generally by the numeral 32. Fluid chamber 32 has a lower annular section 34 and an upper annular section 36 larger in diameter than annular section 34 coupled via a plurality of conduits shown in FIG. 3 as two in number and designated by the numerals 38 and 40. In this regard, it will be understood that gyro wheel rotor 30 may be fabricated in two halves, each carrying one-half of fluid chamber 32. The two wheel rotor halves are joined as by welding or the like to form an integral fluid chamber which extends within and around gyro wheel rotor 30.

As heretofore described with reference to FIGS. 1 and 2, fluid 26 is disposed in lower fluid chamber section 34 as aforenoted. The lower fluid chamber section may have a port or the like (not otherwise shown) through which the fluid is received, and thereafter the port is sealed so that the fluid is retained in the lower chamber section. Chamber 32 has a moment arm designated as M1 serving the purpose described with reference to FIGS. 1 and 2.

Spin axis S—S of rotor wheel 30 is maintained near vertical during the "power-off" or disabled mode of gyro operation since fluid 26 resides in lower fluid chamber section 34 below inner and outer gimbal axes I—I and O—O, respectively.

During the "power-on" mode of gyro operation, i.e. spin up of gyro wheel rotor 30, fluid 26 in lower fluid chamber 34 tends to migrate into upper fluid chamber section 36 via conduits 34 and 40 due to the spin centrifugal acceleration of the wheel rotor as heretofore described.

It will now be recognized that, except for the fluid chamber being integral with the rotor, the embodiments of the invention shown in FIGS. 1 and 2 and in FIG. 3, as well as the operation of said embodiments, are the same.

It will be understood that in both embodiments of the invention, appropriate structure is provided (not otherwise shown) to provide a hermetically sealed gyro, the same being well known in the art.

There has thus been described a fluid pendulum arrangement for implementing fast initial erection of vertical gyros, wherein the fluid pendulum arrangement is a passive mechanical arrangement that replaces and eliminates the need for low reliability mechanical components and associated electronics which have heretofore been required for fast erection torquer circuits. The present invention thus relates to a reliable, cost effective method of implementing fast erection as required for rapid arming of unmanned flight vehicles and is thus a distinct improvement over the prior art.

With the above description of the invention in mind, reference is made to the claims appended hereto for a definition of the scope of the invention.

What is claimed is:

1. For use with a gyro of the type including an inner gimbal, an outer gimbal and a gyro wheel having a rotor journaled in the inner gimbal for rotating about a spin axis, a fluid pendulum arrangement for maintaining the gyro wheel near vertical when the gyro is in a disabled mode, said fluid pendulum arrangement comprising:
   a fluid chamber having a moment arm arranged with the gyro wheel rotor and having an upper section and a lower section, said lower section disposed below the inner and outer gimbal rotational axes;
   a plurality of conduits communicating with the upper and lower gyro wheel rotor sections;
   the mass of the fluid and the moment arm of the fluid chamber cooperating to provide a gyro wheel pendulosity that is greater than the combined gyro component friction torques to maintain said wheel near vertical when the gyro is in the disabled mode; and
   the fluid tending to migrate from the lower fluid chamber section to the upper fluid chamber section via the plurality of conduits due to the gyro wheel spin centrifugal accelerations, and the upper fluid chamber section arranged relative to the inner and outer gimbal rotational axes so that the net dynamic gyro wheel pendulosity is negligible when the gyro is in an enabled mode.

2. A fluid pendulum arrangement as described by claim 1, wherein:
   the fluid chamber is external the gyro wheel rotor and is secured thereto so as to rotate therewith about the spin axis.

3. A fluid pendulum arrangement as described by claim 1, wherein:
   the fluid chamber is internal the gyro wheel rotor and is integral therewith.

4. A fluid pendulum arrangement as described by claim 2, wherein:
   the upper fluid chamber section is annular in shape and extends around the gyro wheel rotor;
   the lower fluid chamber section is annular in shape and smaller in diameter than the upper fluid chamber section, and extends around the gyro wheel rotor; and
   the plurality of conduits extend around the upper and lower fluid chamber sections.

5. A fluid pendulum arrangement as described by claim 3, wherein:
   the upper fluid chamber section is annular in shape and extends within and around the gyro wheel rotor;
   the lower fluid chamber section is annular in shape and smaller in diameter than the upper fluid chamber section, and extends within and around the gyro wheel rotor; and
   the plurality of conduits extend around the upper and lower fluid chamber sections and within the gyro wheel rotor.

6. For use with a gyro of the type including an inner gimbal, an outer gimbal and a gyro wheel having a rotor journaled in the inner gimbal for rotating about a spin axis, a fluid pendulum arrangement for maintaining the gyro wheel near vertical when the gyro is in a disabled mode, said fluid pendulum arrangement comprising:
   a chamber external the gyro wheel rotor and secured thereto so as to rotate therewith about the spin axis;
   a fluid disposed in the chamber below the inner and outer gimbal rotational axes;

the mass of the fluid and the moment of the chamber cooperating to provide a gyro wheel pendulosity that is greater than the combined gyro component friction torques to maintain said wheel near vertical when the gyro is in the disabled mode; and the fluid tending to migrate upwardly within the chamber due to the gyro wheel spin centrifugal accelerations to a section of the chamber arranged relative to the inner and outer gimbal rotational axes whereby the net dynamic gyro wheel pendulosity is negligible when the gyro is in an enabled mode.

7. A fluid pendulum arrangement as described by claim 6, wherein the chamber includes:

an upper section and a lower section, said lower section disposed below the inner and outer gimbal rotational axes, with the fluid disposed in the lower section;

a plurality of conduits communicating with the upper and lower sections, and through which conduits the fluid tends to migrate upwardly within the chamber to the upper section, said upper section arranged relative to the inner and outer gimbal rotational axes whereby the net dynamic gyro wheel pendulosity is negligible when the gyro is in an enabled mode.

8. A fluid pendulum arrangement as described by claim 7, wherein:

the upper fluid chamber section is annular in shape and extends around the gyro wheel rotor;

the lower fluid chamber section is annular in shape and smaller in diameter than the upper fluid chamber section, and extends around the gyro wheel rotor; and the plurality of conduits extend around the upper and lower fluid chamber sections.

* * * * *